US005428342A

United States Patent [19]

Enoki et al.

[11] Patent Number: 5,428,342

[45] Date of Patent: Jun. 27, 1995

[54] ANALYZING SYSTEM FOR OPERATING CONDITION OF ELECTRICAL APPARATUS

[75] Inventors: Hideo Enoki, Ibaraki; Masataka Kawauchi, Nishinomiya; Hiroshi Ohki, Tsuchiura; Ichiro Nakamura, Katsuta; Kazuo Sakai, Ibaraki, all of Japan

[73] Assignee: Hitachi, Ltd., Tokyo, Japan

[21] Appl. No.: 872,074

[22] Filed: Apr. 22, 1992

[30] Foreign Application Priority Data

Apr. 25, 1991 [JP] Japan .................................. 3-095150

[51] Int. Cl.[6] .......................... G08B 29/00; H04B 3/00

[52] U.S. Cl. ..................................... 340/511; 340/538; 340/870.21; 340/310.01

[58] Field of Search .................... 340/511, 538, 310 R, 340/310 A, 310 CP, 525, 870.21

[56] References Cited

U.S. PATENT DOCUMENTS

| | | | |
|---|---|---|---|
| 3,737,858 | 6/1973 | Turner et al. | 340/505 |
| 4,203,096 | 5/1980 | Farley et al. | 340/538 |
| 4,429,299 | 1/1984 | Kabat et al. | 340/538 |
| 4,454,502 | 6/1984 | Fahey et al. | 340/507 |
| 4,644,320 | 2/1987 | Carr et al. | 340/538 |
| 4,808,841 | 2/1989 | Ito et al. | 340/310 CP |
| 4,884,060 | 11/1989 | Shapiro | 340/514 |
| 4,962,473 | 10/1990 | Crain | 340/541 |
| 4,977,390 | 12/1990 | Saylor et al. | 340/538 |
| 5,189,394 | 2/1993 | Walter et al. | 340/525 |

FOREIGN PATENT DOCUMENTS

| | | |
|---|---|---|
| 0232947 | 8/1987 | European Pat. Off. . |
| 63-53696 | 7/1988 | Japan . |

OTHER PUBLICATIONS

Housekeeping Application with Bus Line and Telecommunication, K. Iida, H. Yahiro & A. Kubo, vol. CE-32, No. 3, Aug. 1986, pp. 558-565.

Patent Abstract of Japan, Publication No. JP 3078420, Kyushu Electric Power, Co., Inc., Y. Hisao, et al. Jun.-1991.

Dranetz, pp. 1-12; Catalog of Toyo Technica Co. Apr. 1992.

*Primary Examiner*—Donnie L. Crosland
*Attorney, Agent, or Firm*—Evenson, McKeown, Edwards & Lenahan

[57] ABSTRACT

A system for analyzing the operating conditions of electrical apparatus in order for the aged to check the change and abnormal state of life and for the external institute to check the safety of the houses or homes and so on. The data of standard power spectra of particular consumption current for each apparatus are stored in the memory of the system. The electrical signal detected from the wiring conductor is converted into a digital signal by the preprocessor and undergoes fast Fourier transform at the processor so as to be converted into an extracted power spectrum. If the extracted power spectrum includes a particular one of the standard power spectra as a result of comparing this spectrum with the standard power spectra, the operating conditions of that apparatus are stored in the memory with lapse of time. Thus, the life condition/rhythm of the private person can be checked by himself from the operating conditions of apparatus, and also transmitted as life information through the communication network to the outside institutes.

17 Claims, 9 Drawing Sheets

| TIME | APPARATUS A | APPARATUS B | APPARATUS C |
|---|---|---|---|
| $t_1$ | ON, 1 | ON, 3 | OFF, – |
| $t_2$ | ON, 1 | OFF, – | ON, 4 |
| --- | --- | --- | --- |

ANALYZING SYSTEM FOR OPERATING CONDITION OF ELECTRICAL APPARATUS

BACKGROUND OF THE INVENTION

This invention relates to an analyzing system suitable for analyzing the operating conditions of individual electrical apparatus.

There is known an amount-of-consumption supervisory control system which, as disclosed in Japanese Patent Laid-open Gazette No.63-53696, monitors the change of the amount of consumption of electric power or gas and detects the abnormal consumption, in which case an alarm is displayed and electric power or gas is stopped.

This system is directly connected to a watt-hour meter or gas-flow meter so as to monitor the total amount of the consumption. Thus, it cannot detect information about the operations of individual apparatus. In addition, since it cannot detect the abnormal conditions of individual apparatus, it is difficult to relatively detect the abnormal conditions of small-power consuming apparatus. Moreover, if power or gas is stopped, other apparatus than abnormally operating apparatus are also stopped, with the result that continuously operating apparatus or electrical apparatus cannot be operated on the basis of a timer. Also, the life patterns or living conditions of residents cannot be known in detail from the total amount of consumption of electric power or gas.

In the near future, the number of the aged who live alone will be supposed to markedly increase with the increase of the population of persons of advanced ages. Thus, the aged and the living-alone persons who are apt to keep in less contact with the society or community are difficult to check the change or abnormality of their life by themselves. In addition, a system for emergency will become necessary to look after these persons. Therefore, it becomes important to grasp the life patterns and conditions of living of these persons.

In recent years, the home electronics have been advanced and a variety of electrical appliances (hereinafter, simply called the apparatus) have been used in many homes. These apparatus include electric lights, refrigerators and so on which are probably articles necessary for living, comforts of life such as air conditioners, and information apparatus such as videos and personal computers. It is no exaggeration to say that the life patterns of individuals can be known from the kinds, operating date, operating time and frequency of use of apparatus which private persons enjoy or operate.

It can be considered to attach a sensor to each of the apparatus and to record the situations in which respective apparatus are operated, but this is uneconomical depending on the kinds and cost of apparatus. In addition, all the information concerning the use of the apparatus must be collected and processed. However, the transmission from each apparatus to a processor such as a computer needs an additional communication system.

A power supply quality analyzing system for analyzing the quality of, the commercial power supply which supply power to each apparatus in a house is marketed by TOYO TECHNICA of Japan. According to this analyzing system, the effect of the power supply quality on the operation of various apparatus is analyzed from the waveform of the power so that the trouble due to power can be made clear.

SUMMARY OF THE INVENTION

Accordingly, it is an object of the invention to provide a analyzing system capable of analyzing the operating conditions of apparatus of each house.

The above object can be achieved by providing detection means for detecting consumption current in apparatus within a house, memory means which has previously stored therein standard current waveforms for each apparatus, analyzing means for analyzing the operating condition of each apparatus on the basis of the waveform of the consumption current detected by the detection means and the standard current waveforms, and output means for producing information which is analyzed by the analyzing means.

The above object can also be achieved by further providing communication means for transmitting the information analyzed by the analyzing means, and external output means for producing the information through the communication means.

According to this invention, since the current waveforms of consumption currents are compared with the standard waveforms for apparatus, the operating condition of each apparatus can be estimated from the comparison. Thus, the life pattern can be analyzed. In addition, it is possible to have access to the condition of apparatus from the external through the communication means.

DESCRIPTION OF THE PREFERRED EMBODIMENTS

Figure 1:
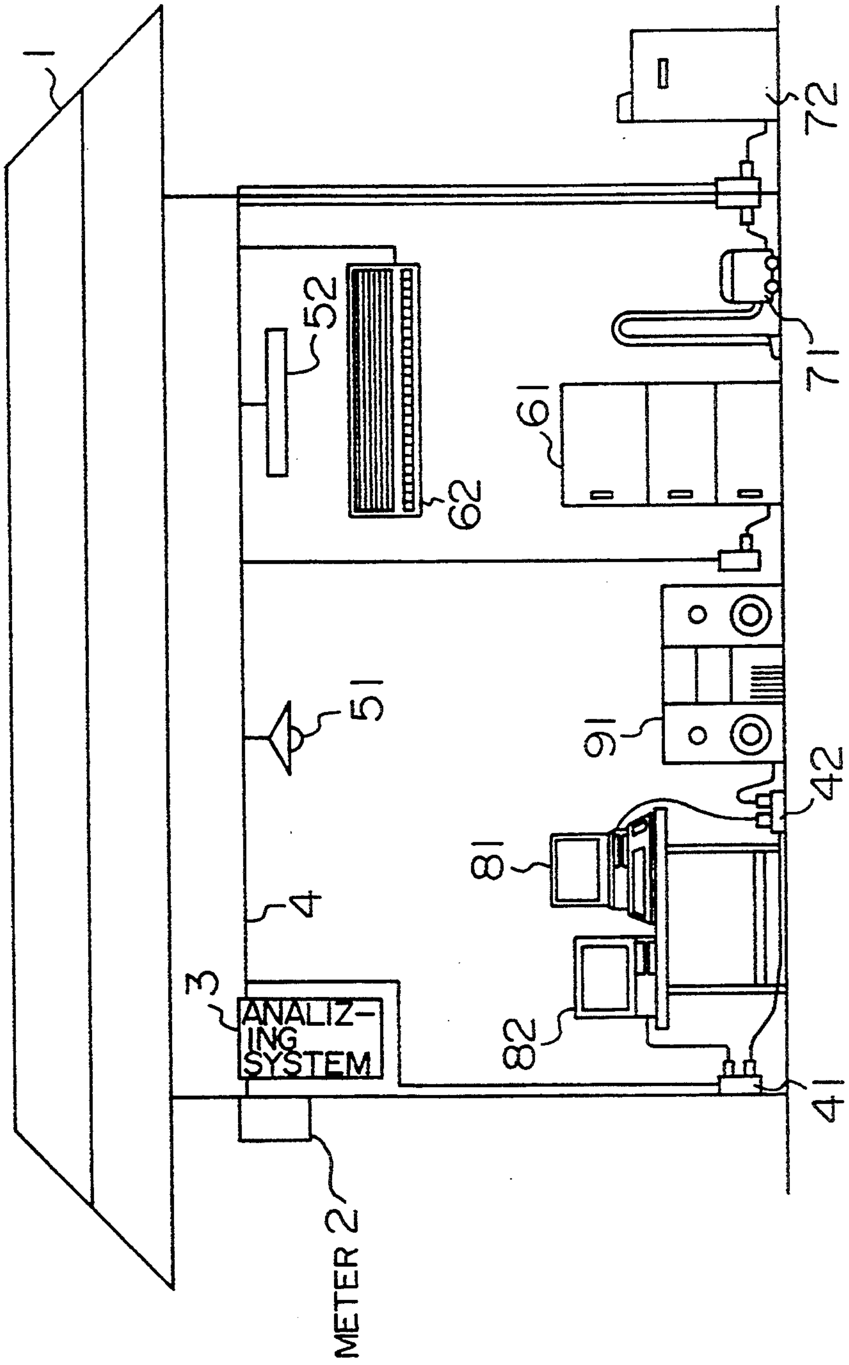
FIG. 1 is a diagram showing the arrangement of apparatus within a house.

One embodiment of the invention will be described with reference to FIGS. 1, 2 and 3. Referring to FIG. 1, a general house.1 has electric power, gas and water laid on, and the amounts of consumption of power, gas and water are respectively accumulated by a meter 2 which is mounted on the outside wall of the house 1, and read and recorded by a meterman at every periods of time. In this embodiment, an analyzing system 3 for always analyzing the amount of consumption of power is connected near the meter 2 of the house 1. The analyzing system 3 analyzes current flowing in the house through the meter 2 as will be described later. The apparatus within the house 1 have power cords connected to wall outlets 41 or table taps 42 which are connected to the ends of electric wiring conductor 4. The amounts of consumption current and the patterns of change of consumption current with time are different depending on the operating apparatus.

Illuminators 5 such as a light bulb 51 and a fluorescent light 52, when switched on, always consume a constant amount of current. On the other hand, environment control apparatus 6 such as a refrigerator 61 and an air conditioner 62 change consumption currents stepwise because they intermittently operate on the basis of environmental parameters such as a set temperature. A washing machine 72 intermittently operates according to set conditions. A vacuum cleaner 71 and the washing machine 72 continuously change the consumption currents in accordance with the change of the amount of the load such as the amount of absorbed dust and the washing. In addition, information apparatus 8 such as a personal computer 81 and a television set 82, and the fluorescent light 52 generate high frequency noise, which is mixed in the wiring conductor 4. The audio apparatus such as a stereo set 91 always changes the consumption power according to the sound volume and frequency emanated therefrom. Thus, it will be understood that the apparatus operated within the house 1 have their own current consumption patterns.

Figure 2:
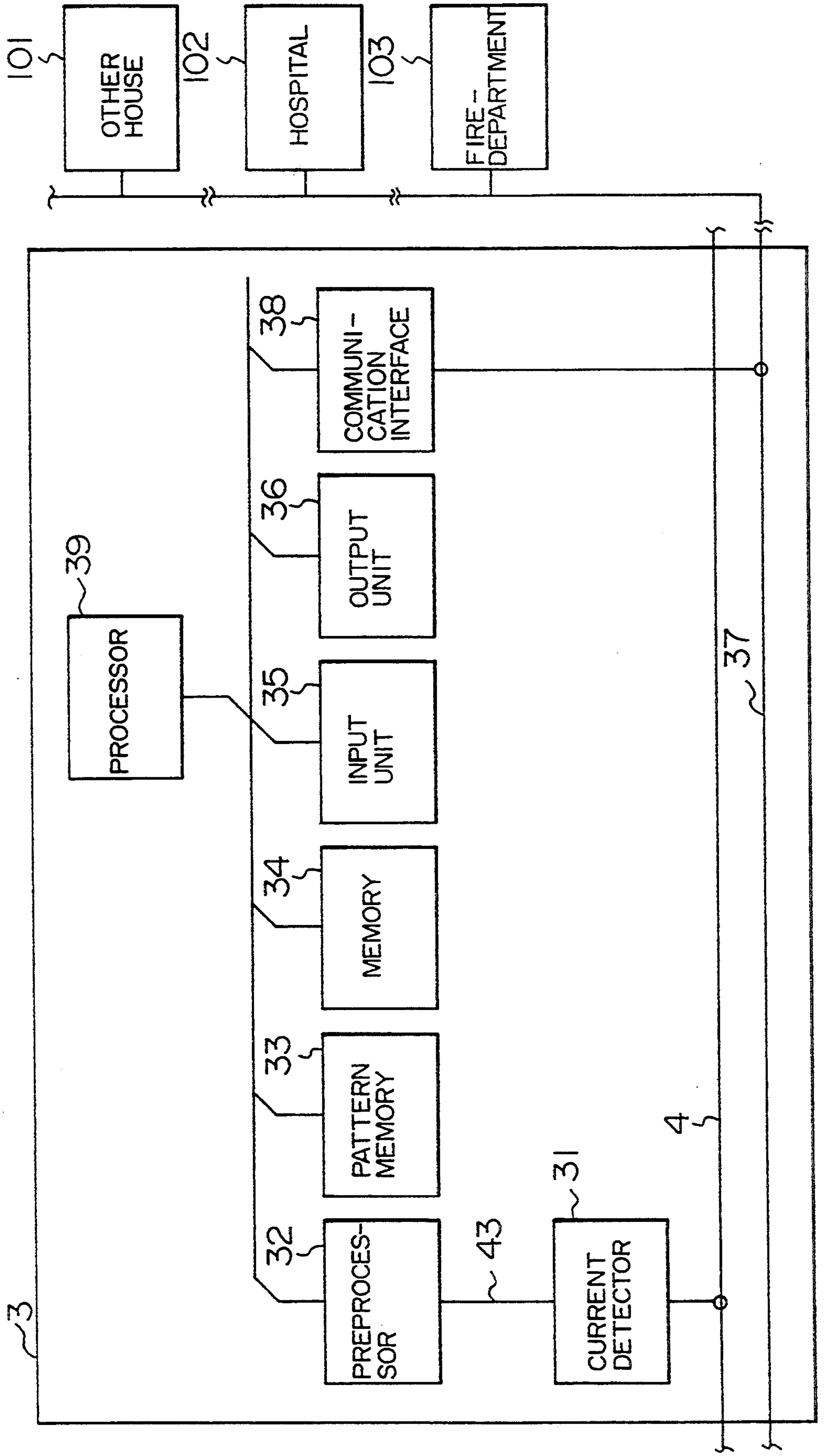
FIG. 2 is a diagram of the construction of a system of one embodiment of the invention.

As shown in FIG. 2, the analyzing system 3 includes a current detector 31 for detecting current in a wiring conductor 4, a preprocessor 32 for making preprocessing of a current signal 43 detected by the current detector 31, a pattern memory 33 for storing the standard amounts of current consumption and standard patterns of the apparatus, a memory 34 for recording the detected operating date and operating time of the apparatus under operation, an input unit 35 for receiving commands and data from the external, an output unit 36 such as a monitor for displaying the result, a communication interface 38 for transmitting signals through a communication network 37 to other houses or homes 101, hospitals 102, fire departments 103 and so on, and a processor 39 for controlling each portion and making data processing.

The operation of the analyzing system 3 will be described below.

The current signal 43 detected by the current detector 31 contains consumption currents of now operating ones of the apparatus connected to the ends of the wiring conductor 4 and high frequency noise generated from the now operating apparatus which consumption current and noise have patterns of changes with time.

Therefore, the current signal 43 is sampled at intervals of, for example, 0.1 msec, and converted into a digital form by the preprocessor 32. The digital signal is temporarily stored in the preprocessor 32. The processor 39 reads out all the digital signal from the preprocessor 32 at intervals of several seconds and analyzes the waveforms of change with time into frequency spectra by fast Fourier transform (FFT). The frequency spectra thus analyzed are assumed to be called as the extracted power spectra.

Since each apparatus has its own consumption current pattern, the current flowing in the wiring conductor 4 when each apparatus alone is operated is previously detected by the current detector 31. The current signal is converted into a digital signal by the preprocessor 32 and converted by the processor 39 according to the fast Fourier transform into a power spectrum. This spectrum is stored in the pattern memory 33 as a standard power spectrum 44 of this operated single apparatus. FIG. 3 shows the power spectra 44 of respective apparatus. Each of the standard power spectra 44 has peaks 441 and rises 442 peculiar to its apparatus at different frequencies. Thus, the frequencies and magnitudes of the peaks and rises peculiar to these apparatus are stored as standard data 46 in the pattern memory 33.

Figure 3:
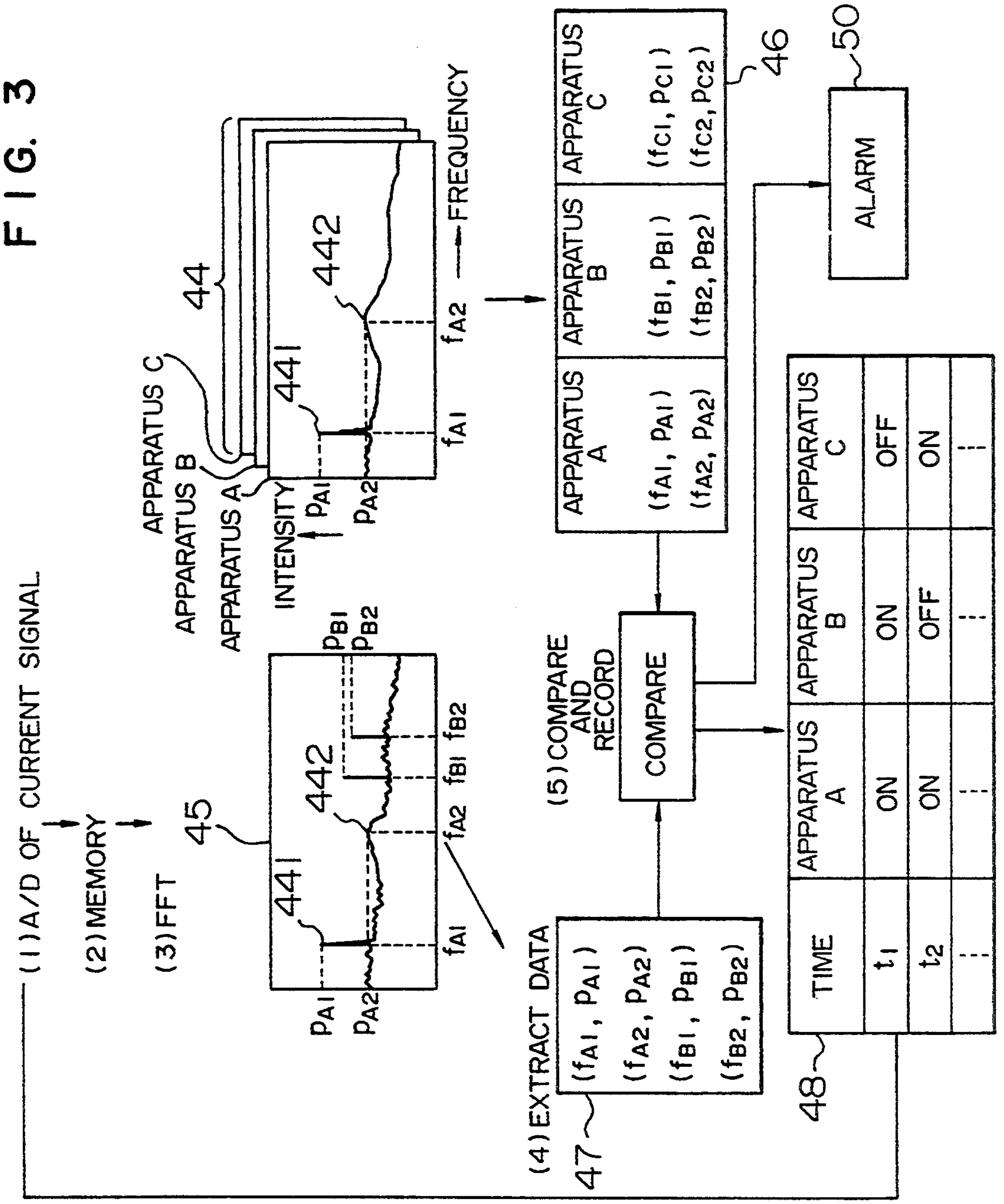
FIG. 3 is a conceptional diagram of operation to which reference is made in explaining the principle of the invention.

The standard power spectra 44 and standard data 46 of all the apparatus are measured and stored in the pattern memory 33 in the form shown in FIG. 3.

The order of operations in the analyzing system of the invention will be described with reference to FIG. 3.

At step 1, the preprocessor 32 samples the current signal detected by the current detector 31 at intervals of 0.1 msec and converts the samples into a digital form in accordance with the command from the processor 39.

At step 2, the preprocessor 32 temporarily stores the digital signal in its memory.

At step 3, the processor 39 reads the digital signal from the memory of the preprocessor 32, and converts it into an extracted power spectrum 45 by the fast Fourier transform. This fast Fourier transform is executed at intervals of several seconds.

At step 4, the peaks and rises are obtained from the extracted power spectrum 45, and the frequencies and magnitudes of those peaks and rises are detected and stored as extracted data 47 in the memory of the processor.

At step 5, the standard data 46 of each apparatus read from the pattern memory 33 and the extracted data 47 are compared with each other, and the apparatus (for example, apparatus A, B) of which the pattern of the frequencies and intensities are coincident with those of the standard data in a predetermined range are decided to be now operating, and recorded in the memory 34 as operating apparatus data 48 together with the time at which data have been obtained (the operating apparatus is indicated by on-apparatus, and the inoperative apparatus by off-apparatus).

The operations (1) to (5) are repeated with a period of several seconds.

When one of extracted data 46 does not coincide with the standard data 47 as the result of the comparison at step 5, any one of the apparatus is decided to be in the abnormal condition different from the standard mode. Then, an alarm signal is generated from an alarm 50 within the output unit 36.

While in this embodiment the features of frequencies and intensities of the peaks of the power spectrum of the consumption current in the apparatus are extracted and compared with the standard power spectra of the apparatus, it can be easily inferred from this embodiment that other various approaches such as correlational method may be used for discrimination of apparatus. In addition, the operating time per day, of the operating apparatus data 48 for each apparatus may be displayed on the output unit 36 or the data may be transmitted through the communication network 37 to other homes 101, hospitals 102 and fire departments 103. The operating date, time, frequency and correlation of each operating apparatus can also be periodically processed for various statical treatments by the processor 39 so that the life patterns of individuals can be known and that the abnormal conditions of apparatus can be detected, generating a warning which is then displayed on the output unit 36.

Figure 4:
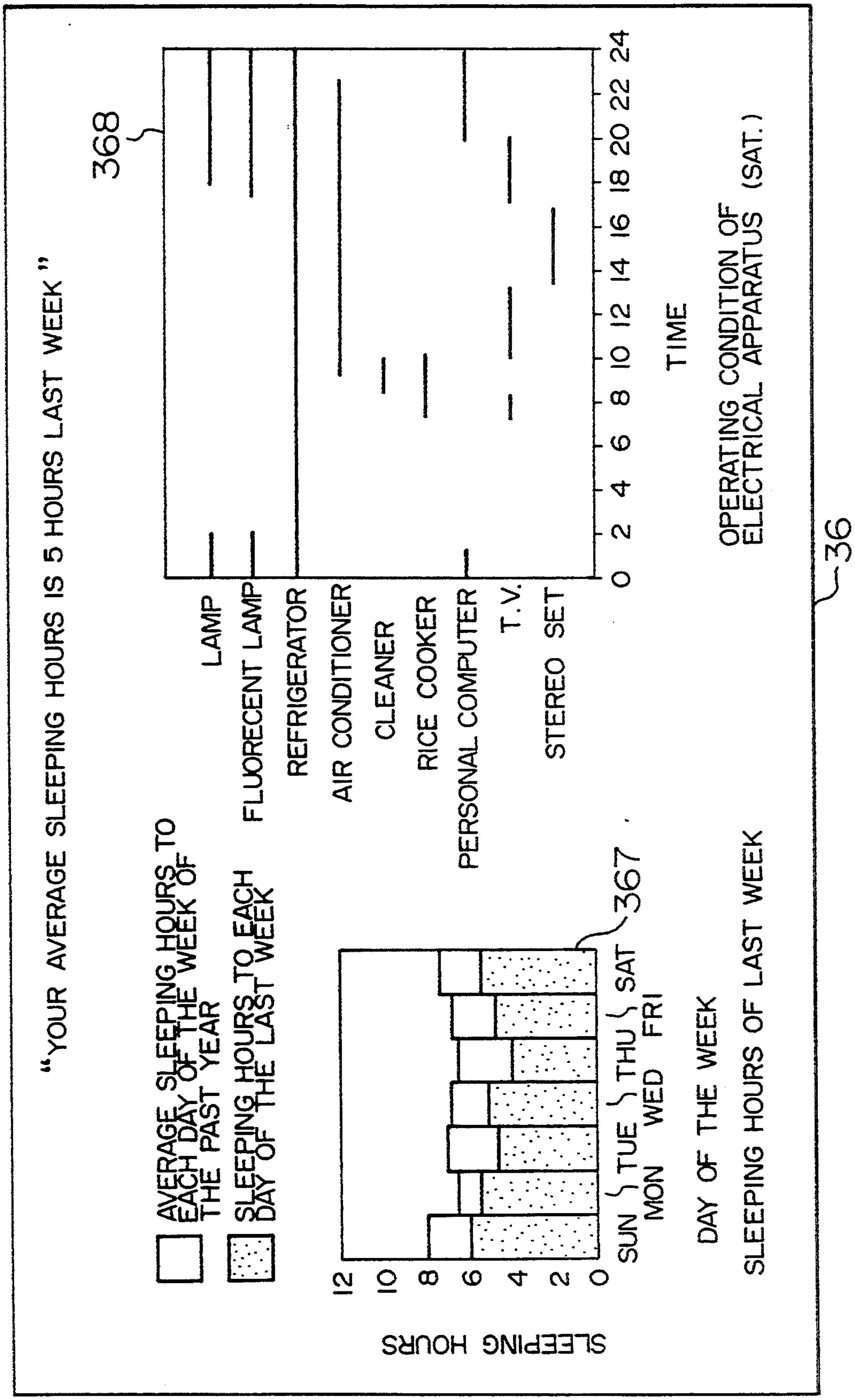
FIG. 4 is a diagram of an example of display according to the system of the invention.

For example, in order to obtain the life pattern, the time at which an apparatus (except the continuously operating apparatus such as refrigerators) is first started to use is assumed to be the hour of rising, and the hour for putting out lights is assumed to be the time to go to bed. Thus, the sleep (rest) pattern can be obtained from the hour of rising and the hour for putting out lights. Then, the standard sleep pattern (data of mean hours of sleep, mean hours of rising, mean hours for putting out lights over a certain period, the standard deviation thereof, and periodical changes of sleep pattern over weeks, months and years) is obtained from the sleep patterns recorded for a predetermined period in the past. When a short sleep pattern relative to the standard sleep pattern is continued for a constant period, or when the hour for putting out lights (the hour of rising) is greatly changed as compared with the standard sleep pattern, the output unit 36 displays a message of "the mean hours of sleep on the last week is . . . " or "the hour for putting out lights (the hour of rising) is irregular" as shown in FIG. 4, and also presents a trend diagram 367 for sleep pattern and a table 368 for operating condition of each apparatus, or makes operations including decisions from learning.

In addition, for the aged who are living alone, the life data mentioned above may be transmitted through the communication network 37 to the hospitals 102 where doctors or counselors analyze these data. Moreover, when a foot warmer or an electric iron is used in the time in which it is not normally used, or when it is used for over many hours, a message of ". . . . left on!" may be displayed and the output unit 36 may cause the speech synthesizer (not shown) to generate a speech or an alarm buzzer to be energized. In addition, when an abnormally large current is flowed in the wiring conductor, the output unit 36 may display a message of "there is the fear of leak!" and cause the speech synthesizer provided within the analyzing system to generate a speech, an alarm buzzer to be excited, or send an alarm through the communication network 37 to other homes 101, and fire departments 103.

Moreover, while in this embodiment the standard data 46 are the frequencies and intensities of the power spectrum of each apparatus, the on-and off-state of apparatus may be naturally decided from the change of the magnitude of the frequency components of the commercial power supply since the change of the root mean square value of the current signal with time is small for apparatus such as illuminators having substantially constant consumption current when operating. Also, while in this embodiment the standard data 46 is previously obtained by turning on a single apparatus, supplying the name of the apparatus to the input unit 35, determining the frequencies and intensities of characteristic peaks from the extracted power spectrum 45 which has been obtained by the analyzing system 3, and storing them in the pattern memory 33 as the standard data 46 for that apparatus, the data of power spectra for each apparatus, if previously measured, may be used for obtaining the standard data and stored in the pattern memory 33.

According to this embodiment, since the standard data peculiar to each apparatus is compared with the extracted data from the consumption current, the apparatus for which their standard data are provided can be discriminated independently of the number and kinds of the apparatus used. In addition, even if the number of apparatus used is increased or decreased, the apparatus can be discriminated. Also, since the standard data for each apparatus are produced by operating each apparatus alone, the apparatus can be discriminated irrespective of the presence of scattered consumption current patterns of similar apparatus. In addition, since the data of apparatus under operating and life patterns are displayed on the output unit, the life information and abnormal conditions of apparatus which usually cannot be well known can be fed back to persons.

Figure 5:
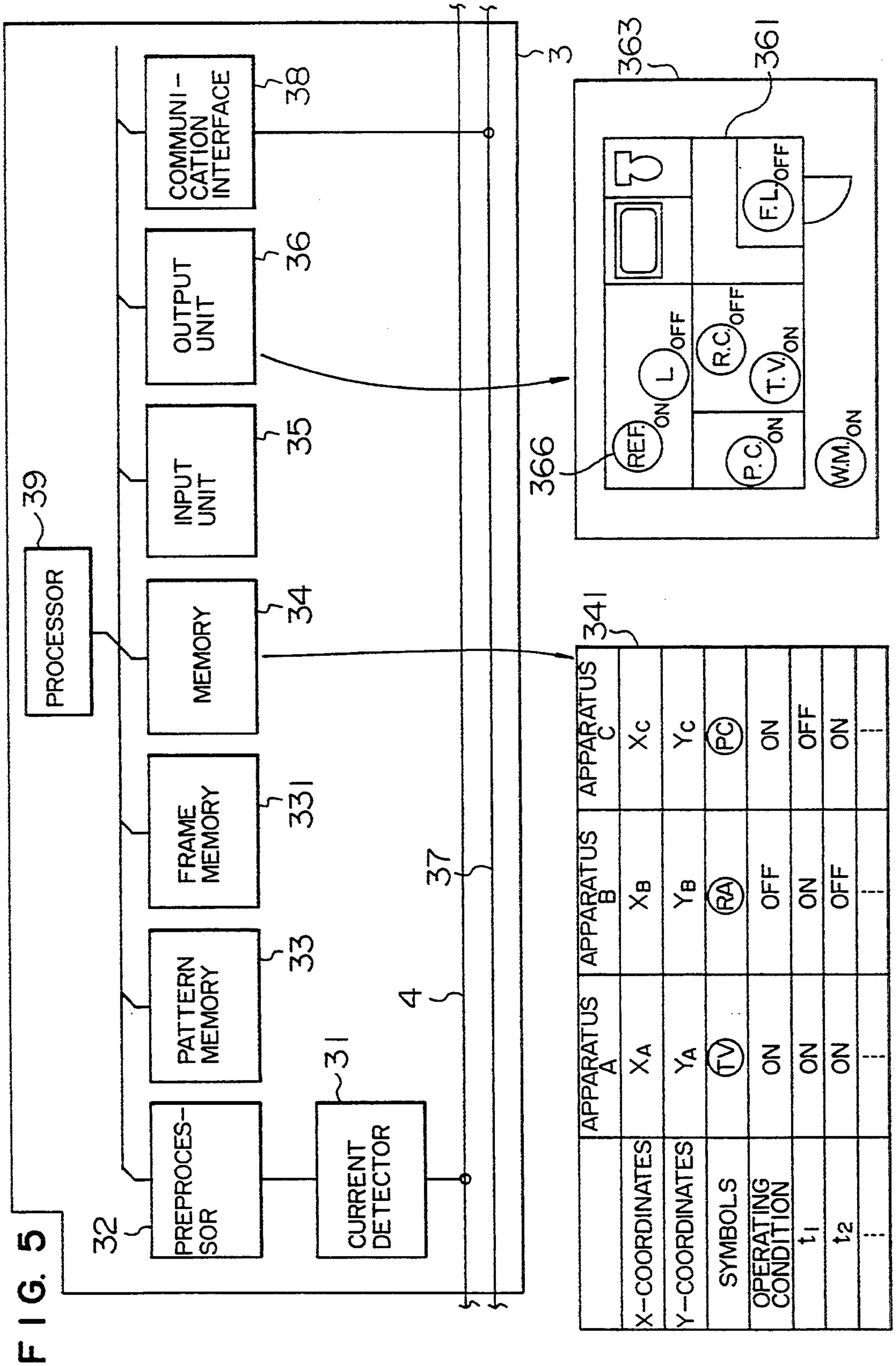
FIGS. 5 to 9 are diagrams of the constructions of other embodiments of systems of the invention.

A second embodiment of the invention will be described with reference to FIG. 5. This embodiment includes, in addition to the elements of the analyzing system 3 of the previous first embodiment, the memory 34 which has stored therein drawing data of a sketch 361 of the house, positional data of X-coordinates and Y-coordinates of the locations of apparatus in the sketch, and a table 341 for listing symbols of kinds of apparatus and ON and OFF indicating the operating and nonoperating states of the apparatus.

A frame memory 331 records image data according to the drawing data of the sketch 361 stored in the memory 34 and data of the table 341. The image data is displayed on a display 363 of the output unit 36 as illustrated. In other words, the display 363 displays the sketch 361, an image 366 of symbols or pictures of the apparatus at their locations, and operating conditions of the apparatus such as, colour, light and shade, or on and off of the image 366.

According to this embodiment, the operating conditions of the apparatus of each room within a house can be seen. Since the locations of the apparatus and the symbols of the operating conditions are indicated within the sketch 361 of the house which is displayed on the output unit 361, the residents and other persons can be informed of abnormal conditions of apparatus and useless power-on and so on together with the positional information. This increases the safety and power-saving effect.

Figure 6:
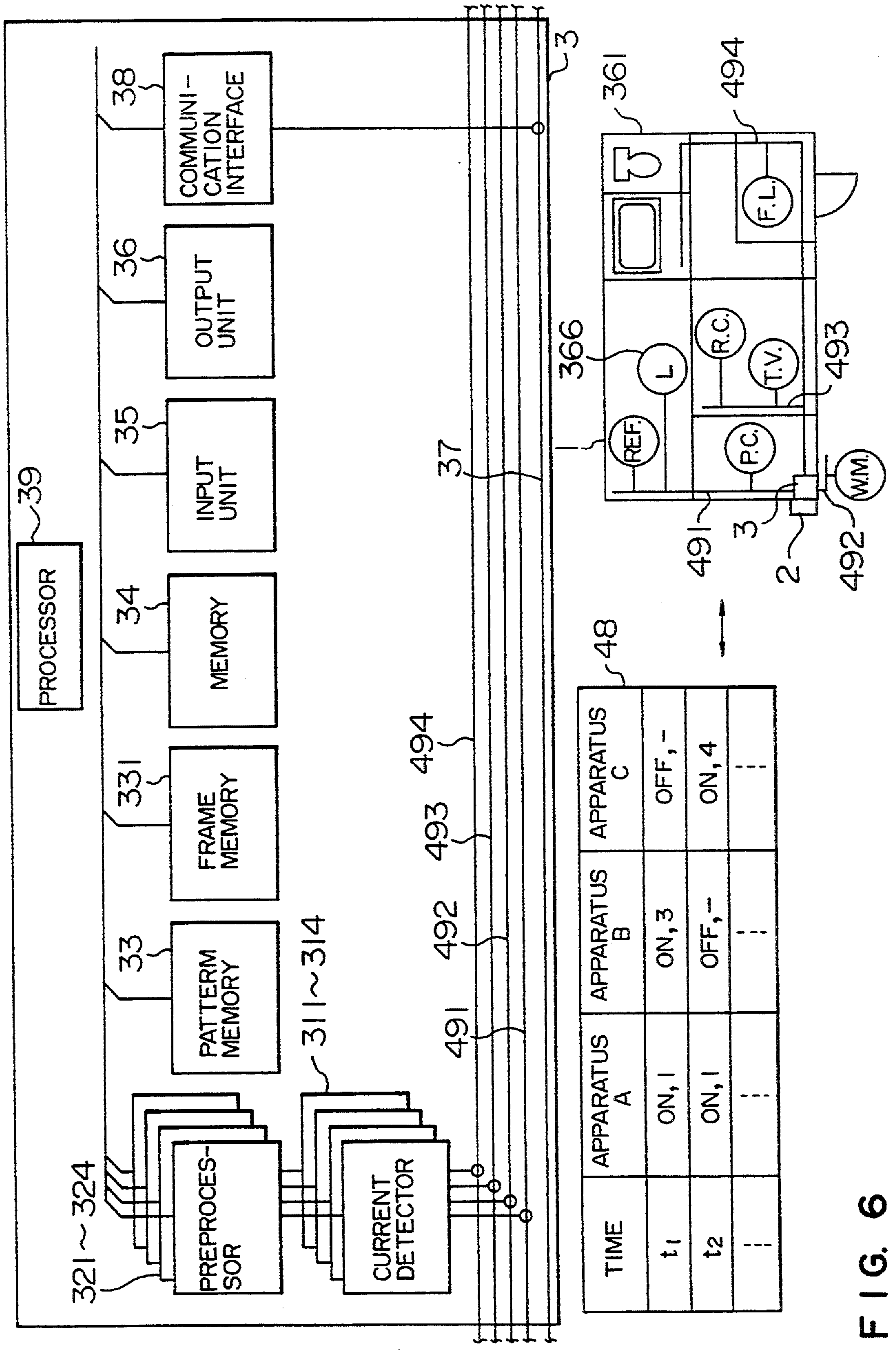

FIG. 6 shows a third embodiment of the invention. In this embodiment, a plurality of current detectors are provided, or current detectors 311 to 314 are, respectively, connected to branch conductors 491 to 493 of the wiring conductor 4 to detect consumption currents flowing through wall outlets which are connected to the branch conductors. The data supplied from the current detectors 311 to 314 to the preprocessors 321 to 324 are processed as in the previous embodiments, but the operating apparatus data 48 are added with data of the locations (room number) of the wall outlets or branch conductors. In addition, the image 366 for each apparatus is displayed on the output unit 36 as shown in FIG. 5.

According to this embodiment, if the branch conductors are respectively provided for the rooms, the apparatus of each room where the corresponding outlets are provided can be confirmed about the operating conditions. Thus, if the apparatus can be moved from a room to another, the locations of the operating apparatus can be detected. Accordingly, the vacuum cleaner or the like can be confirmed about its location, and hence the sanitary conditions of the respective rooms within the house can be supposed from the course of the vacuum cleaner. Also, since the apparatus-using condition for the resident in each room can be known, the life patterns of private persons who live in the same house can be grasped. In addition, the abnormal states of apparatus in each room can be detected and treated apart from other rooms.

Figure 7:
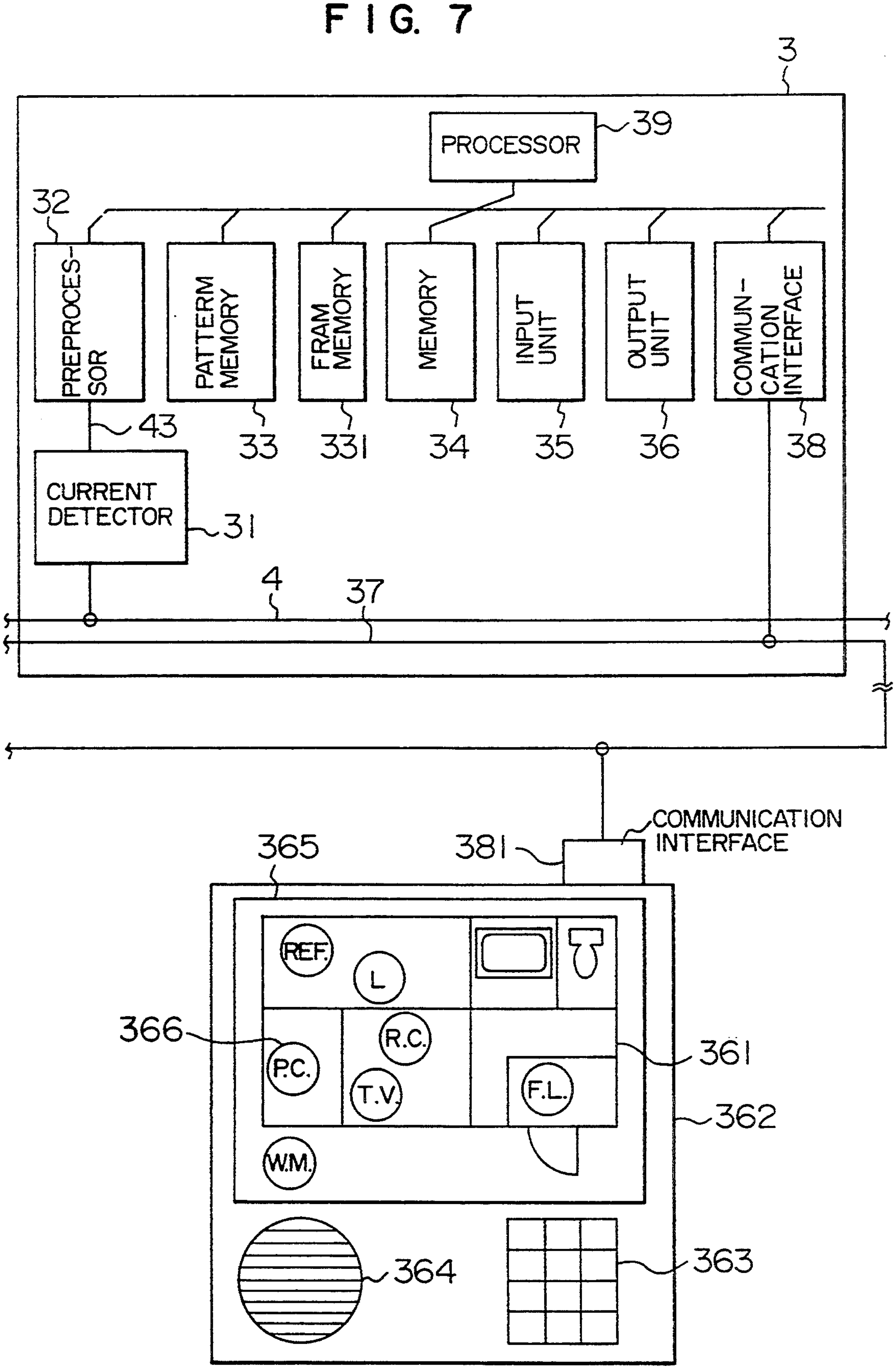

FIG. 7 shows a fourth embodiment of the invention. In this embodiment, a remote controller 362 is additionally provided to be separate from the analyzing system 3. The analyzing system 3 includes a radio communication interface (not shown) as a part of the communication interface 38 or the communication network 37. The remote controller 362 includes a communication interface 381 for communication with the communication interface 38, an input key board 363 (including a power switch), an alarm buzzer 364 and a liquid crystal display 365. The information of abnormal states and on/off states of apparatus detected by the analyzing system 3 are supplied to the remote controller 362 through the path of the radio communication interface or communication interface 38→communication network→communication interface 381, so that it is reported to persons through the alarm buzzer 364 and the liquid crystal display. The image data and table 341 in the sketch 361 are stored in the memory of the remote controller 362, and the table is updated by the data which is transmitted through the communication network. When the remote controller 362 is operated to communicate with the analyzing system 3, a password may be inputted through the input key board so that the user can be identified.

According to this embodiment, since the analyzing system can be operated by the portable remote controller, the operating conditions or abnormal states of the apparatus can be known directly from the remote controller, not from the analyzing system which is distant from the user. In addition, the operating conditions and abnormal states of the apparatus can be detected from a distant place out of the house. Also, since the user can be identified by the input of the password, invasion of privacy can be prevented.

Figure 8:
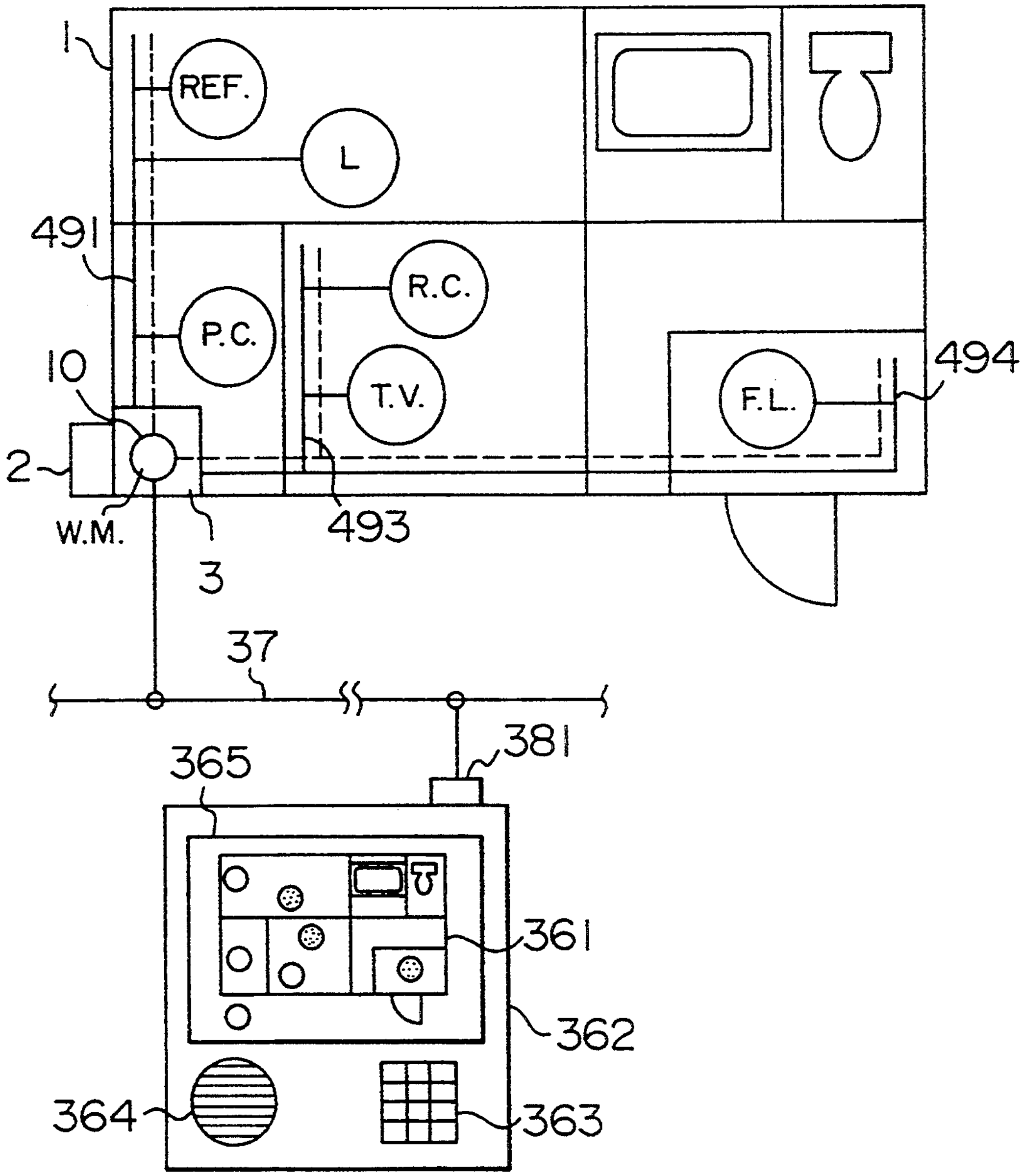
Figure 9:
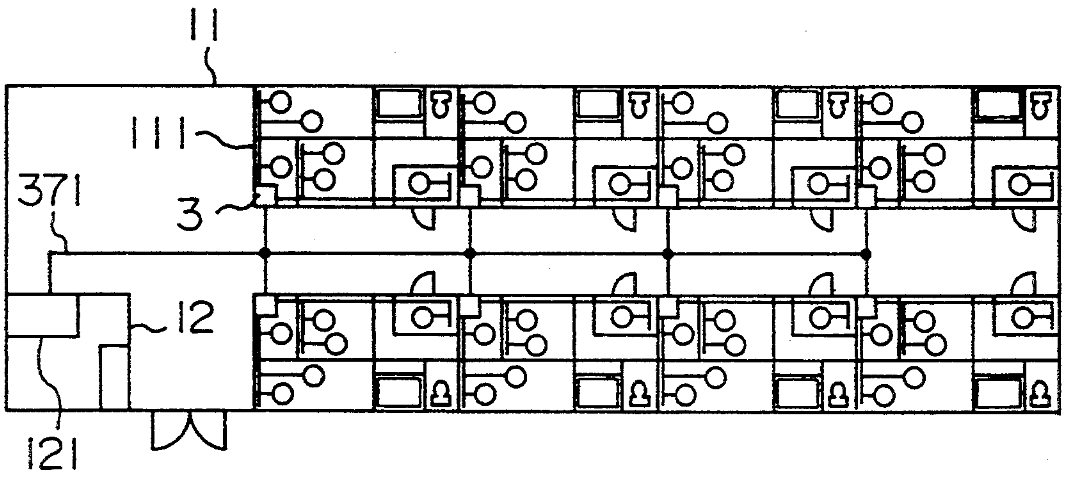

FIG. 8 shows a fifth embodiment of the invention. This embodiment assumes a house provided with an operation unit 10 for turning on or off the apparatus of the house through the communication network 37. The operation unit 10 is supplied with a command to turn,on or off the apparatus, through the path of the remote controller 362→communication network 37→operation unit 10 from the remote controller 362 at a distant place. Since the result of the operation and the presence or absence of an abnormal state of apparatus can be confirmed through the path of the analyzing system 3→communication network 37→remote controller 362, a command is transmitted through the path of the remote controller 362→communication work 37→operation unit 10 to the operation unit 10 so as to turn off the power to the abnormal apparatus the time of an abnormal state, thus preventing an accident from occurring. In addition, when the user has forgotten turning off the power of apparatus, the unit 10 can be supplied with a command to turn off through the remote controller and communication network 37 as described above, thus increasing the safety and convenience. While in this embodiment an abnormal state of an apparatus, if detected by the analyzing system can be treated through the path of (a) analyzing system 3→(b) communication network 37→(c) remote controller 362→(d) person or the user→(e) remote controller 362 →(f) communication network 37→(g) operation unit 10→(h) abnormal apparatus, a communication cable may be provided between the analyzing system 3 and the operation unit 10 to bypass the path of (b) to (f) so that the command can be transmitted directly from the analyzing system 3 to the operation unit 10 to turn off the abnormal apparatus, the result being sent to the person or user through the path of (a) to (d). FIG. 9 shows a sixth embodiment of the invention. This embodiment is the installation of the analyzing systems 3 in the apartments of an apartment house or high-class apartment house. The analyzing system 3 is installed in each apartment 111 of an apartment house and connected to a centralized analyzing system 121 of a super's room 12 through a common wiring conductor 371 which is laid in the apartment house. The centralized analyzing system 121 receives the information of the conditions of apparatus within the apartment 111 from the analyzing system 3 of each apartment 111 through the common conductor 371. This information is sent in a time sharing manner. The centralized analyzer 121 supplies the received information to its output unit (not shown) such as a monitor.

According to this embodiment, since the abnormal state of the apparatus within each apartment can be detected by the centralized analyzing system 121, the super or other persons can make the safety management of apartments in the absence of their masters.

While the consumption currents in the apparatus are analyzed in the above embodiments, the power consumption may be similarly analyzed for the same effect.

According to this invention, the time of rising and time to go to bed can be known by detecting and recording the time of switching on and off electric lights. In addition, if this data is periodically compared with the past data, the life rhythm associated with the time of rising and time to go to bed can be detected. Also, the sanitary state can be supposed from the frequency/time of use of a vacuum cleaner and washing machine. This is only an example of the information obtained about the use of the apparatus. Since the apparatus are used in their particular ways and closely related to all the general human lives, it is possible to properly check the condition and rhythm of the private person. Therefore, if this analyzing system is used by the person of advanced age or the person who is living alone, or who is possibly in less contact with the society or community, he is able to check the change of his life and abnormal state by himself. Moreover, if the minimum necessary life information is transmitted through the communication network to his relatives, a public health center or medical institution or fire department, it is possible to solve the lack of communication and take an emergency measure for an accident. In addition, in a home for the aged where persons of advanced age live in a group, the caretakers are able to effectively know the life pattern of each person of advanced age and give detailed treatment and instructions.

What is claimed is:

1. An apparatus-state analyzing system for electrical apparatus comprising:
   - a data memory for previously storing standard data peculiar to each electrical apparatus provided within a living space;
   - a detector for detecting an electrical signal flowing in an electric wiring conductor through which electric power is supplied to said electrical apparatus, said detector being coupled to an inlet end of said electrical wiring conductor;
   - wherein said standard data is obtained by detecting said electrical signal flowing in said electric wiring conductor for each electrical apparatus operating alone;
   - a processor for discriminating operating conditions of each of said electrical apparatus on the basis of said electric signal detected by said detector and said standard data from said data memory; and
   - a display for displaying the operating conditions discriminated by said processor.

2. An apparatus-state analyzing system according to claim 1, wherein said standard data is data including particular frequency components which are produced on said electric wiring conductor while each of said electric apparatus is operating.

3. An apparatus-state analyzing system according to claim 2, wherein said standard data is data further including the magnitude of each of said frequency components.

4. An apparatus-state analyzing system comprising:

a plurality of apparatus state analyzing systems according to claim 1 which are provided in a plurality of living spaces; and means which is provided at a single place in order to concentrically observe information of the operating conditions of said electrical apparatus in said living spaces.

5. An apparatus-state analyzing system according to claim 4, wherein said living spaces are rooms within a house.

6. An apparatus-state analyzing system according to claim 5, wherein said living spaces are houses.

7. An apparatus-state analyzing system for electrical apparatus comprising:

a data memory for previously storing standard data peculiar to each electrical apparatus provided within a living space;

a detector for detecting an electrical signal flowing in an electric wiring conductor through which electric power is supplied to said electrical apparatus;

wherein said standard data is obtained by detecting said electrical signal flowing in said electric wiring conductor for each electrical apparatus operating alone;

a processor for discriminating operating conditions of each of said electrical apparatus on the basis of said electric signal detected by said detector and said standard data from said data memory; and a display for displaying the operating conditions discriminated by said processor;

wherein said standard data is data including particular frequency components which are produced on said electric wiring conductor while each of said electric apparatus is operating;

wherein said processor has means for extracting the frequency components from said electrical signal on said electrical wiring conductor, and means for specifying one of said electrical apparatus presently operating by comparing the frequency components extracted by said extracting means with said standard data and selecting the components corresponding to said standard data.

8. An apparatus-state analyzing system for electrical apparatus comprising:

a data memory for previously storing standard data peculiar to each electrical apparatus provided within a living space;

a detector for detecting an electrical signal flowing in an electric wiring conductor through which electric power is supplied to said electrical apparatus;

a processor for discriminating operating conditions of each of said electrical apparatus on the basis of said electric signal detected by said detector and said standard data from said data memory; and a display for displaying the operating conditions discriminated by said processor;

wherein said processor has an A/D converting means for converting said electrical signal into a digital signal, a Fourier transform means for Fourier-converting said digital signal converted by said A/D converting means into a frequency spectrum, means for extracting data of the characteristic frequency components and the magnitudes from said frequency spectrum which said Fourier transform means generates, comparing means for comparing said extracted data and said standard data, finding one of said extracted data corresponding to said standard data, and selecting one of said electrical apparatus associated with said detected corresponding standard data.

9. An apparatus-state analyzing system according to claim 8, wherein said comparing means has means for issuing an alarm indicative of the presence of an abnormal-state one of said electrical apparatus when said extracted data includes data not corresponding to said standard data.

10. An apparatus-state analyzing system according to claim 9, wherein said alarm means is provided at a remote place from said living space.

11. An apparatus-state analyzing system for electrical apparatus comprising:

a data memory for previously storing standard data peculiar to each electrical apparatus provided within a living space;

a detector for detecting an electrical signal flowing in an electric wiring conductor through which electric power is supplied to said electrical apparatus, said electrical signal having a frequency with a frequency component and magnitude;

wherein said standard data is obtained by detecting said electrical signal flowing in said electric wiring conductor for each electrical apparatus operating alone;

a processor for discriminating operating conditions of each of said electrical apparatus on the basis of said electric signal detected by said detector and said standard data from said data memory; and a display for displaying the operating conditions discriminated by said processor;

wherein said standard data memory analyzes the frequency of the electrical signal detected for each of said apparatus when each of said electrical apparatus is operated in order, and stores the frequency component and magnitude peculiar to each apparatus as said standard data for each apparatus.

12. An apparatus-state analyzing system for electrical apparatus comprising:

a data memory for previously storing standard data peculiar to each electrical apparatus provided within a living space;

a detector for detecting an electrical signal flowing in an electric wiring conductor through which electric power is supplied to said electrical apparatus;

wherein-said standard data is obtained by detecting said electrical signal flowing in said electric wiring conductor for each electrical apparatus operating alone;

a processor for discriminating operating conditions of each of said electrical apparatus on the basis of said electric signal detected by said detector and said standard data from said data memory; and a display for displaying the operating conditions discriminated by said processor;

wherein said display is provided at a remote place from said living space.

13. An apparatus-state analyzing system according to claim 12, further comprising communication apparatus for transferring information of the operating state produced from said processor to said display.

14. An apparatus-state analyzing system for electrical apparatus comprising:

a data memory for previously storing standard data peculiar to each electrical apparatus provided within a living space;

a detector for detecting an electrical signal flowing in an electric wiring conductor through which electric power is supplied to said electrical apparatus;

wherein said standard data is obtained by detecting said electrical signal flowing in said electric wiring conductor for each electrical apparatus operating alone;

a processor for discriminating operating conditions of each of said electrical apparatus on the basis of said electric signal detected by said detector and said standard data from said data memory; and a display for displaying the operating conditions discriminated by said processor;

wherein said display has a memory for storing drawing data of a sketch of said living space and apparatus data of apparatus within said sketch, a frame memory for storing image data to be displayed on the basis of the drawing data and apparatus data within said memory, and display means for displaying said image data from said frame memory.

15. An apparatus-state analyzing system according to claim 14, wherein said apparatus data includes symbol data indicating the symbol of each apparatus, coordinates data indicative of the location of each apparatus within said drawing data, and a signal indicating that each apparatus is operating or not.

16. An apparatus-state analyzing system according to claim 15, wherein said signal indicative of the operating condition of each apparatus is integrated with lapse of time.

17. An apparatus-state analyzing system according to claim 15, wherein said apparatus data is recorded in a table.

* * * * *